(12) United States Patent
Heil

(10) Patent No.: US 8,210,008 B2
(45) Date of Patent: Jul. 3, 2012

(54) IGNITION MODULE WITH MULTI-BEAM SPRING

(75) Inventor: Stefan Heil, Wuppertal (DE)

(73) Assignee: Lear Corporation, Southfield, MI (US)

( * ) Notice: Subject to any disclaimer, the term of this patent is extended or adjusted under 35 U.S.C. 154(b) by 897 days.

(21) Appl. No.: 12/188,538

(22) Filed: Aug. 8, 2008

(65) Prior Publication Data

US 2010/0031718 A1   Feb. 11, 2010

(51) Int. Cl.
*B60R 25/02* (2006.01)
(52) U.S. Cl. ............. 70/252; 70/361; 70/387; 70/389; 70/429; 70/432; 70/438; 70/DIG. 55
(58) Field of Classification Search ............ 70/182–186, 70/252, 361, 386–390, 429, 432, 438, DIG. 54, 70/DIG. 55; 307/10.3–10.6; 200/43.01, 200/43.03, 43.04, 43.05, 43.06, 43.07, 61.58 R, 200/61.59; 340/407.1, 407.2, 5.72, 5.64, 340/426.35, 426.36, 5.31, 426.11, 426.12, 340/426.3
See application file for complete search history.

(56) References Cited

U.S. PATENT DOCUMENTS

| | | | | |
|---|---|---|---|---|
| 158,111 | A * | 12/1874 | Miller | 70/38 C |
| 1,016,541 | A * | 2/1912 | Boone et al. | 70/389 |
| 1,369,308 | A * | 2/1921 | Taylor | 70/247 |
| 3,320,782 | A * | 5/1967 | Turman | 70/388 |
| 5,087,090 | A * | 2/1992 | Humphrey et al. | 292/359 |
| 5,291,766 | A * | 3/1994 | Eisermann | 70/276 |
| 6,286,345 | B1 * | 9/2001 | Kim et al. | 70/189 |
| 6,389,856 | B1 * | 5/2002 | Watanuki et al. | 70/186 |
| 6,523,378 | B2 * | 2/2003 | Kuo | 70/360 |
| 6,609,508 | B2 | 8/2003 | Sexton | |
| 6,776,016 | B1 * | 8/2004 | Wittwer et al. | 70/252 |
| 7,334,441 | B1 * | 2/2008 | Amundson et al. | 70/252 |
| 7,392,675 | B2 * | 7/2008 | Kito | 70/252 |
| 7,581,422 | B2 * | 9/2009 | Schindler | 70/252 |
| 7,895,868 | B2 * | 3/2011 | Yamaguchi et al. | 70/392 |
| 7,930,916 | B2 * | 4/2011 | Tamezane et al. | 70/387 |
| 7,930,917 | B2 * | 4/2011 | Katagiri et al. | 70/387 |
| 2003/0172695 | A1 * | 9/2003 | Buschmann | 70/361 |
| 2004/0003791 | A1 | 1/2004 | Ghelfi et al. | |
| 2004/0129042 | A1 * | 7/2004 | Harada et al. | 70/252 |
| 2005/0012593 | A1 | 1/2005 | Harrod et al. | |
| 2005/0034493 | A1 * | 2/2005 | Wittwer et al. | 70/186 |
| 2006/0053848 | A1 | 3/2006 | Ghabra et al. | |
| 2006/0145810 | A1 | 7/2006 | Buccinna et al. | |
| 2006/0220458 | A1 | 10/2006 | Feldman et al. | |

* cited by examiner

*Primary Examiner* — Lloyd Gall
(74) *Attorney, Agent, or Firm* — Brooks Kushman P.C.

(57) ABSTRACT

An ignition module assembly having a housing member connectable to an ignition system the housing having an undulating surface. A slider member is connected to the housing member and moved between a plurality of discrete positions. The slider member controls the ignition system based on its discrete position. The slider member is configured to receive a key fob. A spring member is compressed between the slider member and the undulating surface and is configured to slide along the undulating surface as the slider member moves between the plurality of discrete positions. The undulations correspond to the discrete positions and a user inserting the key fob into the ignition module assembly and moving the slider member receives haptic feedback to discern the position of the slider member.

15 Claims, 5 Drawing Sheets

IGNITION MODULE WITH MULTI-BEAM SPRING

BACKGROUND OF THE INVENTION

1. Field of the Invention

Embodiments of the present invention relate to the field of ignition modules for use with motor vehicles, the ignition modules being configured to receive key fobs.

2. Background Art

Motor vehicles, including, but not limited to, automobiles, include engines which are activated by an ignition module. Historically, the user would insert a key into a lock in the vehicle's ignition module and rotate the key from an off position past an on position to a starter position. While in the starter position, the ignition module starts the engine. The user would then release the key which returns to the on position automatically under the urging of springs or other biasing means in the ignition module.

SUMMARY OF THE INVENTION

Various embodiments of an ignition module assembly are disclosed herein. In a first embodiment, an ignition module assembly includes a housing member that is adapted to be connected to an ignition system of a vehicle. The ignition module assembly further includes a slider member that is slidably connected to the housing member and is configured to move between a plurality of discrete positions with respect to the housing member. The sliding member is further configured to control the ignition system based on the discrete position of the slider member with respect to the housing member. The slider member is further configured to receive a key fob. The ignition module assembly also includes a spring member that is compressed between the slider member and the housing member. In this first embodiment, the ignition system is configured to facilitate the insertion of the key fob into the slider member and moving the slider member with the key fob between the plurality of discrete positions. One of the slider member and the housing member includes an undulating surface. The spring member is further configured to slide along the undulating surface as the slider member moves between the plurality of discrete positions. The undulations in the undulating surface correspond to the discrete positions. The spring member, the slider member, and the housing member cooperate with each other to provide haptic feedback to a user that enables the user to discern when the slider member has moved to one of the plurality of discrete positions.

In an implementation of the first embodiment, the spring member is further configured to engage the key fob when the key fob is inserted into the sliding member. In a variation of this implementation, the spring member includes a key fob engaging leg and the key fob may include a notch and the key fob engaging leg is configured to engage a notch in the key fob. In a further variation, the housing member includes a locking member that is configured to engage the key fob engaging leg as the slider member moves between the plurality of discrete positions. The locking member may retain the key fob engaging leg in an engaged state with the notch when the locking member engages the key fob engaging leg. In a further variation, the locking member may be disposed on the undulating surface.

In another implementation of the first embodiment, the plurality of discrete positions may include a position P0 that corresponds to a position of the slider member when an engine of the vehicle is off. The plurality of discrete positions further includes a position P1 that corresponds to the position of the slider when the engine of the vehicle is on. The plurality of discrete positions further includes a position P2 that corresponds to the position of the slider when the ignition system of the vehicle is actuated. The plurality of discrete positions further includes a position P3 that corresponds to the position of the slider member when the key fob is pushed completely into the housing member. In this implementation, position P3 is inboard of position P2, position P2 is inboard of position P1, and position P1 is inboard of position P0.

In another implementation of the first embodiment, the spring member includes a plurality of spaced apart legs that engage the undulating surface as the slider member moves between the plurality of discrete positions. In a variation of this implementation, the spring member includes a pair of forward extending legs and a pair of rearward extending legs. The pair of forward extending legs are spaced apart from the pair of rearward extending legs. In another variation of this implementation, portions of the undulations of the undulating surface are spaced apart by a distance that corresponds to a distance between the spaced apart legs such that each spaced apart leg substantially simultaneously encounters a corresponding undulation as the sliding member moves between the plurality of discrete positions. In a variation of this implementation, the undulations include hills and valleys. Each spaced apart leg engages a hill at substantially the same time that each other spaced apart leg engages a hill and each of the spaced apart legs engages a valley at substantially the same time that each other spaced apart leg engages a valley.

In another variation, the undulations include hills and valleys and each spaced apart leg engages a valley when the slider member is disposed in one of the discrete positions.

In another implementation of the first embodiment, the ignition module assembly further includes a blocking member that is connected to the housing member and is configured to move with respect to the housing member between a blocking position and a non-blocking position. The housing member includes a recess to receive a portion of the blocking member. The blocking member is configured to engage the recess and the recess cooperates with the blocking member to obstruct movement of the sliding member between the discrete positions when the blocking member is in the blocking position. The blocking member is configured to disengage from the recess when the blocking member is in the non-blocking position. The blocking member is configured to move to the non-blocking position when the key fob is inserted into the sliding member.

In a second embodiment, an ignition module assembly includes a housing member that is configured to be connected to an ignition system of a vehicle. The housing member has a first wall having a first undulating surface and a second wall having a second undulating surface. The ignition module assembly further includes a slider member that is slidably connected to the housing member and configured to move between a plurality of discrete positions with respect to the housing member. The sliding member is configured to control the ignition system based on the discrete position of the slider member with respect to the housing member. The slider member is further configured to receive a key fob. The ignition module assembly further includes a first spring member that is connected to the housing member proximate the first wall and further connected to the slider member. The first spring member is compressed between the slider member and the first undulating surface. The first spring member is further configured to slide along the first undulating surface as the slider member moves between the plurality of discrete positions. The ignition module assembly further includes a second spring member that is connected to the housing member proximate the second wall and further connected to the sliding member. The second spring member is compressed between the slider member and the second undulating surface. The second spring member is further configured to slide along the second undulating surface as the slider member moves between the plurality of discrete positions. In this second embodiment, undulations in the first and the second undulating surfaces correspond to the discrete positions. A user may operate the ignition system by inserting the key fob into the slider member and moving the slider member with the key fob between the plurality of discrete positions. The first spring member, the second spring member, the slider member and the housing member cooperate to provide haptic feedback to the user that enables the user to discern when the slider member has moved to one of the plurality of discrete positions.

In an implementation of the second embodiment, the first spring member includes a first key fob engaging leg that is configured to engage a first notch in the key fob. The second spring member includes a second key fob engaging leg that is configured to engage a second notch in the key fob. In a variation of this implementation, the housing member includes a first locking member that is configured to engage the first key fob engaging leg and a second locking member that is configured to engage the second key fob engaging leg as the slider member moves between the plurality of discrete positions. The first and the second locking members each retain the respective first and second key fob engaging legs in an engaged state with the first and second notches when the first and the second locking members respectively engage the first and the second key fob engaging legs. In a further variation, the first and the second locking members are disposed on the first and the second undulating surfaces, respectively.

In another implementation of the second embodiment, the first and the second spring members each include a plurality of spaced apart legs that engage the first and the second undulating surfaces, respectively as the slider member moves between the plurality of discrete positions. In a variation of this implementation, the first spring member includes a pair of forward extending legs and a pair of rearward extending legs, the pair of forward extending legs being spaced apart from the pair of rearward extending legs by a defined distance. The second spring member includes a pair of forward extending legs and a pair of rearward extending legs, the pair of forward extending legs being spaced apart from the pair of rearward extending legs by the defined distance.

In a further variation, some of the undulations of the first undulating surface are spaced apart by the defined distance and some of the undulations of the second undulating surface are spaced apart by the defined distance such that the pair of forward extending legs and the pair of rearward extending legs of both of the first and the second spring members substantially simultaneously encounter a corresponding undulation as the sliding member moves between the plurality of discrete positions.

In a third embodiment, an ignition module assembly includes a housing member that is adapted to be connected to an ignition system of a vehicle. The housing member has a first wall having a first undulating surface and a second wall having a second undulating surface. A slider member is slidably connected to the housing member and is configured to move between a plurality of discrete positions with respect to the housing member. The slider member is further configured to control the ignition system based on the discrete position of the slider member with respect to the housing member. The slider member is further configured to receive the key fob. The ignition module assembly further includes a first spring member connected to the housing member proximate the first wall and further connected to the slider member. The first spring member has a first key fob engaging arm, a first pair of forward extending legs and a first pair of rearward extending legs. The first pair of forward extending legs and the first pair of rearward extending legs urge the slider member away from the first undulating surface. The first pair of forward extending legs and the first pair of rearward extending legs being configured to slide along the first undulating surface as the slider member moves between the plurality of discrete positions. The ignition module assembly further includes a second spring member that is connected to the housing member proximate the second wall and further connected to the slider member. The second spring member has a second key fob engaging arm, a second pair of forward extending legs and a second pair of rearward extending legs. The second pair of forward extending legs and the second pair of rearward extending legs urge the slider member away from the second undulating surface. The second pair of forward extending legs and the second pair of rearward extending legs are configured to slide along the second undulating surface as the slider member moves between the plurality of discrete positions. In this third embodiment, undulations in the first and the second undulating surfaces correspond to the discrete positions. A user may operate the ignition system by inserting the key fob into the slider member and moving the slider member with the key fob between the plurality of discrete positions. The first spring member, the second spring member, the slider member and the housing member cooperate to provide haptic feedback to the user that enables the user to discern when the slider member has moved to one of the plurality of discrete positions.

BRIEF DESCRIPTION OF THE DRAWINGS

The description herein makes reference to the accompanying drawings wherein like reference numerals refer to like parts throughout the several views, and in which.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Embodiments of the present invention include a housing member having walls configured with undulating surfaces. The undulations of the undulating surfaces include hills or ramps and valleys or notches. A slider member is configured to slide in an inboard and outboard direction with respect to the housing member. As the slider member is positioned at various discrete positions with respect to the housing member, various features of the ignition system are actuated. For example, at a first discrete position, P0, an engine of the vehicle is off. At a second discrete position, P1, the engine may be on. At a third discrete position, P2, a starter motor is actuated which starts the engine. At a fourth discrete position, P3, the key fob is inserted entirely within the ignition module assembly. To operate the ignition system using the key fob, a user would position the key fob within the slider member and then push the key fob to position P2 to start the vehicle at which time the user would release the key fob. A spring pushes the slider member in an outward or outboard direction until the slider member comes to rest at position P1 where the vehicle's engine is on.

To provide the user with the haptic sensation that allows the user to discern that the key fob and the slider member have been positioned at one or more of the discrete positions mentions above, the walls of the housing member have been configured to include a plurality of hills or ramps and valleys or notches. A beam spring member is compressed between the slider member and the housing member and is configured to slide along the undulating surface of the housing wall. The beam spring has a plurality of appendages which are configured to slide with respect to the housing wall and also to the engage notches or valleys of the undulating surface. When the spring member is moved such that its arms are positioned within a valley or notch, the user receives a tactile or haptic sensation transmitted through the key fob that allows the user to discern that the key fob has moved the slider member to a discrete position. A more complete understanding of the invention may be obtained through a review of the illustrations accompanying this application as well as the detailed discussion of those illustrations included below.

Figure 1:
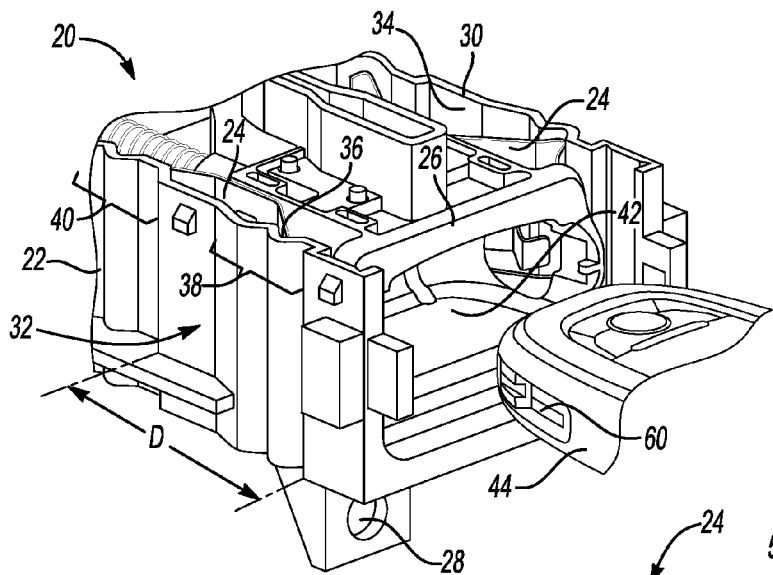
FIG. 1 is a perspective view illustrating an embodiment of an ignition module assembly of the present invention.

With reference to FIG. 1, a perspective view illustrating an ignition module assembly 20 made in accordance with the teachings of the present invention is illustrated. Ignition module assembly 20 may be used with any type of motor vehicle including automobiles, trucks, trains, water craft, aircraft and spacecraft. Furthermore, ignition module assembly 20 may be used in vehicles having any type of propulsion system including, but not limited to, internal combustion engines, electric motors, hybrid-electric vehicles, fuel cell vehicles, jet engines, and rocket engines.

Ignition module assembly 20 includes a housing member 22, two spring members 24 and slider member 26. Housing member 22 includes an opening 28 to permit housing member 22 to be fastened to a vehicle. Opening 28 may receive a threaded fastener which may be used to attach housing member 22 to the vehicle. In other embodiments, other fastening means may be employed to attach housing member 22 to the vehicle. Housing member 22 is configured to be connected to an ignition system of a vehicle such as a conventional electric starter motor which may be used to crank up an internal combustion engine on an automobile. Housing member 22 may be made from a variety of a materials including, but not limited to, POM/PAGF 10.

Housing member 22 includes a first wall 30 and a second wall 32. The first wall 30 includes a first undulating surface 34 and second wall 32 includes a second undulating surface 36.

The undulations of first undulating surface 34 correspond with the undulations of second undulating surface 36. As used herein, the term inboard refers to the direction in which a key fob is inserted into ignition module assembly 20 to initiate vehicle operations. First and second undulating surfaces 34 and 36 each include a series of hills and valleys such that a person running his finger over either undulating surface will feel a series of rises and falls as his finger moves in an inboard direction. In the illustrated embodiment, a first segment 38 of hills and valleys in second undulating surface 36 has a pattern of hills and valleys that is substantially identical to the pattern of hills and valleys of a second segment 40. A person running his finger over first segment 38 while simultaneously running a different finger over second segment 40 at the same rate will detect substantially simultaneous rises and falls in first and second segments 38, 40 as his fingers move in an inboard direction. First undulating surface 34 includes mirror image undulations corresponding to first segment 38 and second segment 40 disposed and spaced apart from one another in a manner substantially identical to the placement of first segment 38 and second segment 40 in second undulating surface 36.

Housing member 22 is further configured to slidably receive sliding member 26. This may be accomplished in a variety of ways including, but not limited to, defining a groove in a surface of housing member 22 and defining a tongue to fit within the groove on an adjacent surface of slider member 26. Other configurations may also be employed.

Slider member 26 is disposed within housing member 22 and configured to slide in an inboard direction with respect to housing member 22. Sliding member 26 may be made from materials including, but not limited to, PA GK15/PA GK30. Slider member 26 includes an opening 42 and includes walls and other structures which are configured to receive key fob 44. A user may insert key fob 44 through opening 42 into slider member 26 and then push slider member 26 in an inboard direction with respect to housing member 22 to operate the vehicle's ignition system. Slider member 26 is configured to move in an inboard direction with respect to housing member 22 between a plurality of discrete positions, as discussed below. Some of the discrete positions correspond with engine conditions such as engine off, engine on and engine start. These positions will be addressed in detail below.

Figure 2:
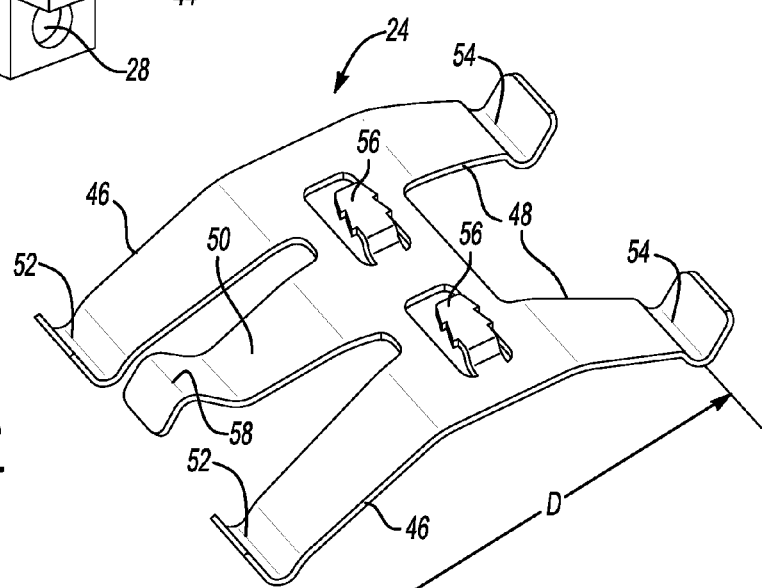
FIG. 2 is a perspective view illustrating an embodiment of a spring member for use with the ignition module assembly of FIG. 1.

Spring members 24, as best seen in FIGS. 1 and 2, are disposed between slider member 26 and the first and the second undulating surface 34, 36 of first wall 30 and second wall 32, respectively. When positioned between slider member 26 and housing member 22, spring member 24 is in compression. Spring member 24 has surface engagement portions (identified by reference numerals 52 and 54 as defined below) to engage the undulations of first and second undulating surfaces 34, 36. As slider member 26 moves inboard with respect to housing member 22, spring members 24 move together with the slider member 26. The hills of first and second undulating surface 34, 36 act as camming surfaces of spring member 24 and further compresses spring member 24 as slider member 26 moves in an inboard direction with respect to housing member 22. As a user inserts a key fob into slider member 26 and moves slider member 26 in an inboard direction, the user will detect an increased resistance to inboard motion of the key fob as springs 24 are compressed by the hills of the undulating surface. After the surface engagement portions reach the crest of the hill, the compressive resistance acting on the key fob diminishes as the slider member 26 continues moving in an inboard direction and the surface engagement portions of spring members 24 move inboard to the next valley. Because the compression of spring member 24 is released as the surface engagement portions approach a valley, the resistance to inboard motion of slider member 26 diminishes until the surface engagement portions come to rest at the bottom of the valley. This engagement between the surface engagement portions and the valleys of the first and the second undulating surfaces 34, 36 provide a haptic sensation that may be similar to that of snapping a fastener. In this manner, a user is capable of physically discerning when slider member 26 reaches a discrete position.

With respect to FIG. 2, an embodiment of spring member 24 is illustrated in perspective view. Spring member 24 includes a pair of forward extending legs 46, a pair of rearward extending legs 48 and a key fob engaging arm 50. Each forward extending leg includes a surface engagement portion 52. Each rearward extending leg 48 includes a surface engagement portion 54. Surface engagement portions 52 and 54 are configured to engage first and second undulating surfaces 34 and 36. Spring member 24 further includes fasteners 56 which are configured to fasten spring member 24 to slider member 26. In the illustrated embodiment, fasteners 56 are Christmas tree type fasteners. In other embodiments, other fasteners including, but not limited to, threaded fasteners, snaps and hook and loop type fasteners may be employed. In still in other embodiments, a hot stamping method may be employed. In other embodiments, fasteners 56 may be configured for attachment to housing member 22 and slider member 26 may be configured to include first and second undulating surfaces similar to first and second undulating surfaces 34 and 36.

Key fob engaging leg 50 includes a key fob engagement portion 58 that is configured to nest within a notch 60 on key fob 44. As key fob 44 is inserted through opening 42 into slider member 26, key fob engaging leg 50 engages key fob 44. As key fob 44 is pushed further inboard into slider member 26, portions of key fob 44 act as a camming surface to bend key fob engaging leg 50 in an outward direction from key fob 44. When key fob 44 is fully seated within slider member 26, key fob engagement portion 58 aligns with notch 60 allowing key fob engaging leg 50 to move inwardly towards key fob 44. With key fob engagement portion 58 nested within notch 60, key fob 44 is at least partially secured within slider member 26 through the engagement between key fob engagement portion 58 and notch 60. In other embodiments, spring member 24 may not include a key fob engaging leg 50. In still other embodiments, a key fob engaging member may be included as part of slider member 26.

When spring member 24 is attached to slider member 26 and positioned between slider member 26 and housing member 22, the pair of forward extending legs 46 and the pair of rearward extending legs 48 are pushed in a direction away from first and second undulating surfaces 34, 36, placing spring member 24 in compression. In other embodiments, spring member 24 may not be in compression when disposed between housing member 22 and slider member 26 and may only become compressed as slider member 26 is pushed in an inboard direction and the forward leg surface engagement portions 52 and rearward leg surface engagement portions 54 encounter the hills or ramps of first and second undulating surfaces 34 and 36.

Forward leg surface engagement portion 52 is spaced apart from rearward leg surface engagement portion 54 by a distance D. An outboard end of first segment 38 is spaced apart from an outboard end of second segment 40 by a distance that corresponds with distance D. The term outboard refers to the direction of travel of key fob 44 as it is removed from ignition module assembly 20. By separating first segment 38 from second segment 40 by a distance corresponding to distance D, forward leg surface engagement portions 52 will encounter undulations that correspond with the undulations encountered by rearward leg surface engagement portion 54 at substantially the same time when slider member 26 is moved in either an inboard or an outboard direction. Spacing the first and second segments 38 and 40 apart in this manner allows the compression and the relaxation of the pair of forward extending legs 46 to be coordinated with the compression and the relaxation of the pair of rearward extending legs 48 as slider member 26 is moved in an inboard and an outboard direction. Such coordination of compression and relaxation can enhance the haptic sensation discerned by the user.

Figure 3A:
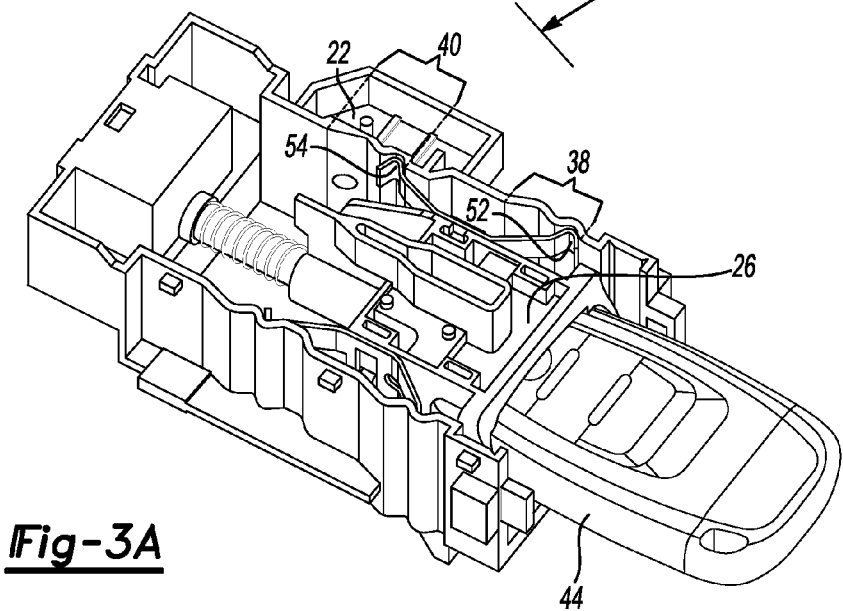
FIGS. 3A-D are perspective views illustrating the ignition module assembly of FIG. 1 as a key fob is inserted into the assembly and moved through a plurality of discrete positions.

FIGS. 3A-3D illustrate key fob 44 and slider member 26 as they move between the discrete positions P0-P3. In the illustrated embodiment, operation of the vehicle and/or the vehicle's ignition system can be controlled based upon the position of slider member 26 with respect to housing member 22. In FIG. 3A, key fob 44 has just been inserted into slider member 26 and key fob engagement portions 58 are engaged with notches 60 disposed along the sides of key fob 44 (notches 60 and engagement between key fob engagement portions 58 and notches 60 are not shown). The position of slider member 26 illustrated in FIG. 3A is position P0. At position P0, the vehicle's engine is off. While at position P0, the forward leg surface engagement portions 52 and the rearward leg surface engagement portions 54 are each positioned within a respective first valley of first segment 38 and second segment 40.

Figure 3B:
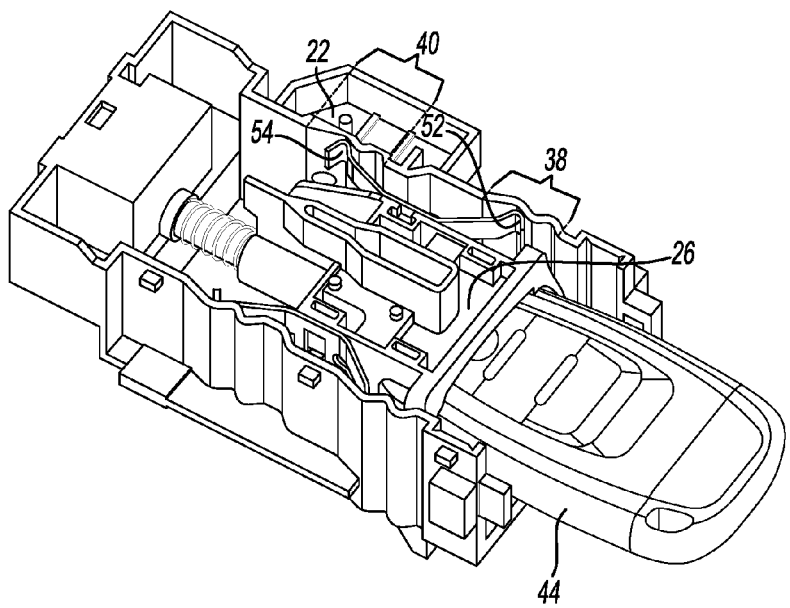

With respect to FIG. 3B, key fob 44 has been pushed inboard to position P1. Position P1 corresponds to the engine on position. This is the position that key fob 44 and slider member 26 would remain in during normal vehicle operations. In position P1, forward leg surface engagement portion 52 and rearward leg surface engagement portion 54 are each disposed in a respective second valley of first and second segments 38 and 40.

Figure 3C:
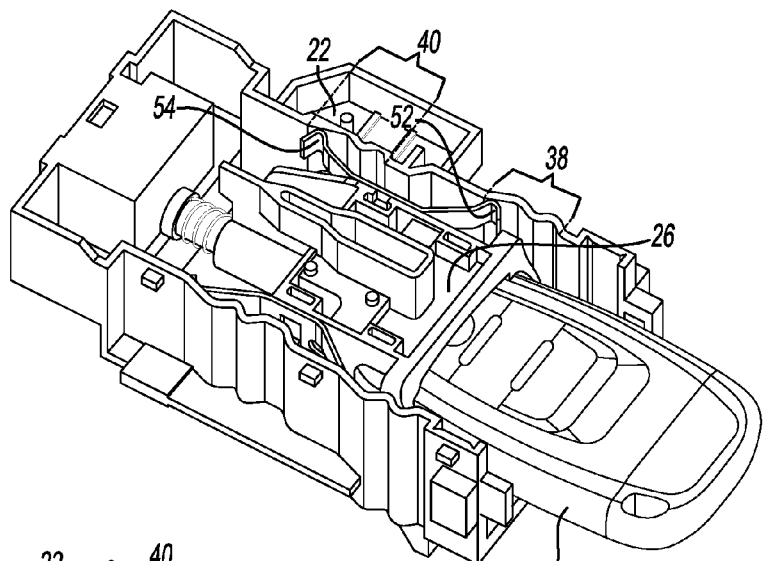

With respect to FIG. 3C, key fob 44 and slider member 26 are disposed in position P2. Position P2 corresponds to an engine start position. Typically, in this position, an electric motor powered by the vehicle's battery cranks the vehicle's internal combustion engine to start it up. At position P2, the forward leg surface engagement portions 52 and the rearward leg surface engagement portions 54 come to rest at the top of a hill in both first and second segments 38 and 40. In this position, the pair of forward extending legs 46 and the pair of rearward extending legs 48 are each compressed by the engagement between the forward leg surface engagement portions 52 and the rearward leg surface engagement portions 54 with the hill of the undulating surface. In this compressed state, and with the respective hills acting as a camming surface, slider member 26 is urged in an outboard direction. When in position P2, the user may relax his push on, or simply release, key fob 44 and slider member 26 will move back to position P1.

Figure 3D:
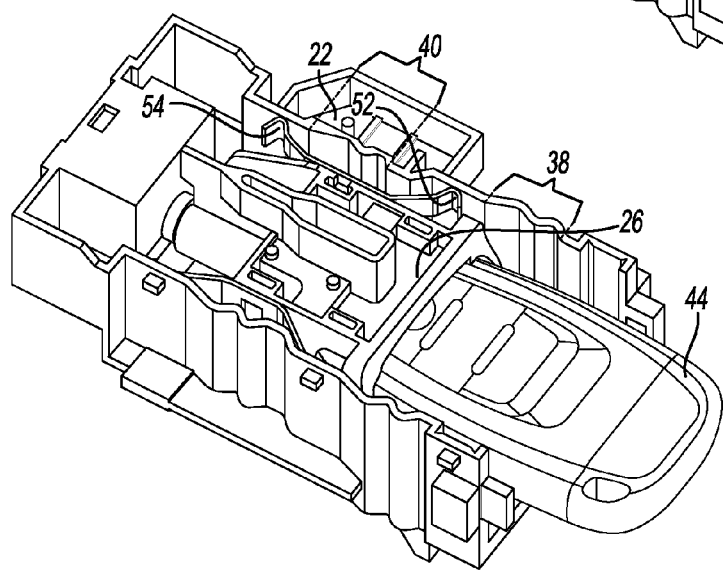

With respect to FIG. 3D, discrete position P3 is illustrated. Position P3 is also known as the crash position. In this position, key fob 44 is fully recessed within ignition module assembly 20. This position helps to prevent injury to a vehicle occupant that comes into contact with key fob 44 during a vehicle collision. At position P3, the forward leg surface engagement portions 52 and the rearward leg surface engagement portions 54 have moved to the inboard most positions of first segment 38 and second segment 40, respectively. To avoid unintentional movement of slider member 26 from position P2 to position P3 during the normal use and operation of the vehicle (for example, during engine start), some embodiments include a rip in housing member 22 that avoids an inboard movement of slider member 26 by using the blocking member 62 while in its unlocked position or some other member or apparatus. Only if the force exceeds a certain level will this rip be plastically deformed and allow the slider member 26 to move to position P3.

Figure 4A:
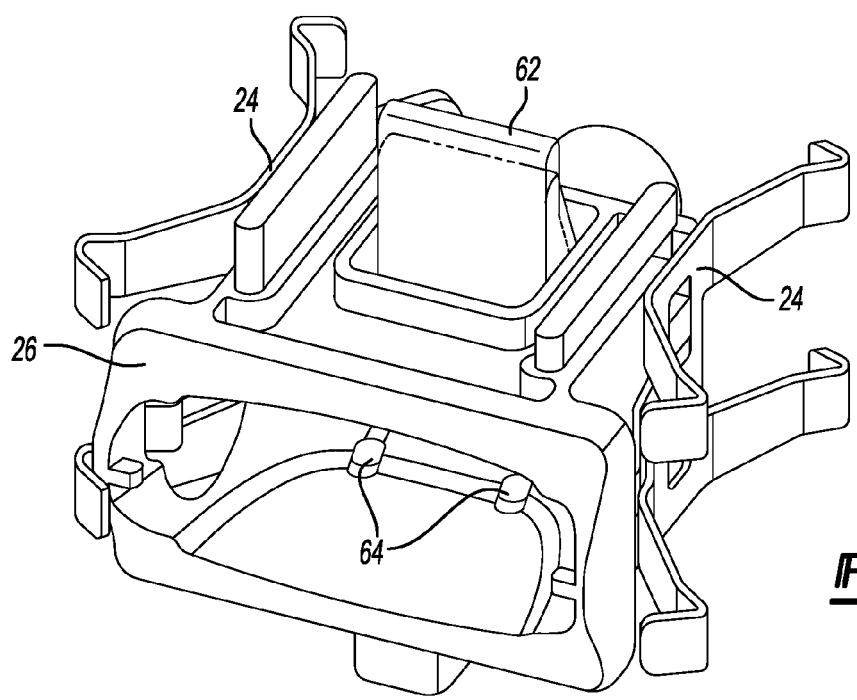
FIG. 4A is a perspective view illustrating the ignition module assembly of FIG. 1 in a different orientation.

With respect to FIG. 4A, a perspective view of the underside of a portion of ignition module assembly 20 is illustrated. A blocking member 62 is seated in slider member 26. Blocking member 62 is configured to move up and down (from the perspective of FIG. 4A) between a blocking position (up) and a non-blocking position (down). Blocking member 62 is illustrated in the blocking position in solid lines and the non-blocking position in phantom lines. In the blocking position, an upper portion of blocking member 62 protrudes above an upper surface of slider member 26. Housing member 22 (not shown) is configured to receive the upper portion of blocking member 62 when blocking member 62 is in the blocking position. When blocking member 62 is in the blocking position and the upper portion of blocking member 62 is engaged with housing member 22, blocking member 62 obstructs inboard motion of slider member 26.

Figure 4B:
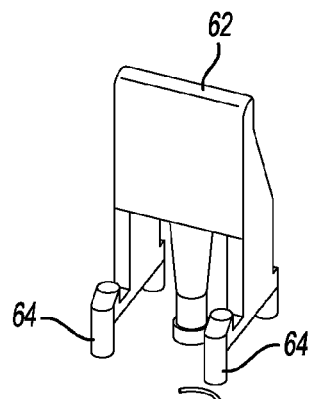
FIG. 4B is an exploded view of the ignition module assembly of FIG. 4A.
Figure 4B:
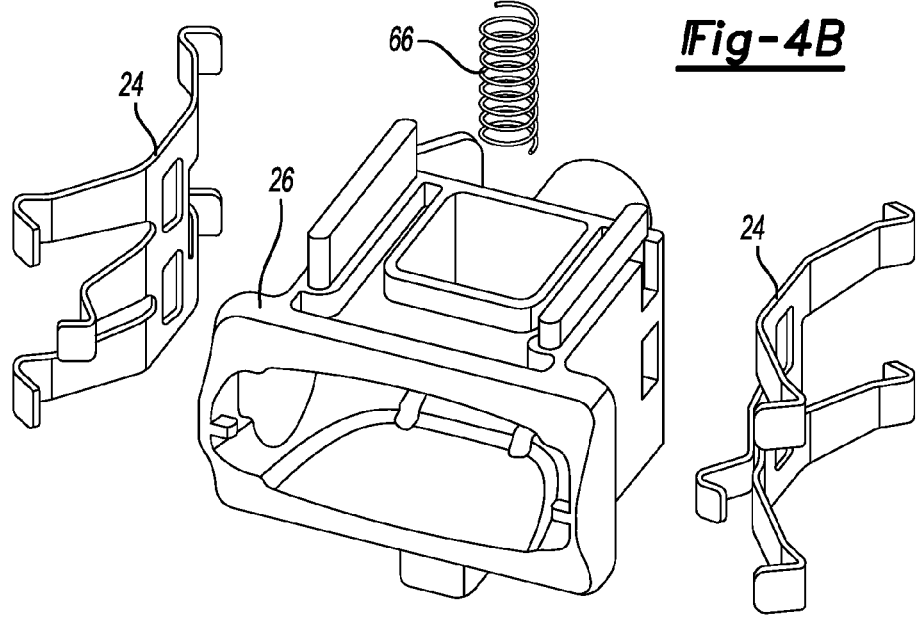

With respect to FIG. 4B, an exploded view illustrating housing member 22, blocking member 62, slider member 26 and spring members 24 is illustrated. In this view, fob engagement portions 64 can be seen. An upper surface of each fob engagement portion is angled upwardly to form a camming surface. These upper surfaces of fob engagement portions 64 are visible in FIG. 4A. As key fob 44 is inserted into slider member 26, a leading edge of key fob 44 encounters the upper surface of fob engagement portion 64. The cammed engagement between the upper surface of fob engagement portion 64 and key fob 44 drive blocking member 62 in a downward direction from the blocking position to the non-blocking position. A blocking member spring 66 is configured to engage slider member 26 and to urge blocking member 62 towards the blocking position. When key fob 44 is removed from slider member 26, blocking member spring 66 pushes blocking member 62 back to the blocking position.

Figure 5:
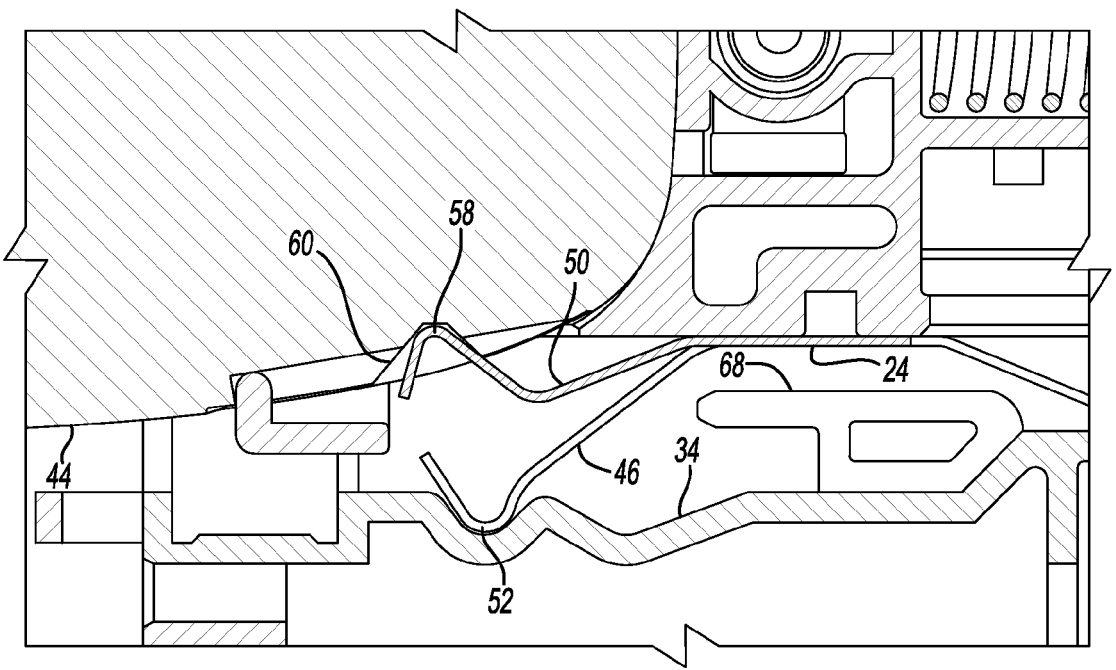
FIG. 5-8 are cross-sectional views illustrating a portion of the ignition module assembly as the key fob is moved through a plurality of discrete positions in an inboard direction into the ignition module assembly.

FIG. 5 is a cross-sectional view illustrating key fob 44 seated within slider member 26 at position P0. Key fob engagement portion 58 is illustrated in an engaged condition with notch 60. In this configuration, key fob engaging leg 50 is urged against key fob 44 and retains key fob engagement portion 58 in an engaged condition with notch 60. A forward extending leg 46 and forward leg surface engagement portion 52 is engaged with a valley of first undulating surface 34. A locking member 68 is positioned inboard of key fob engaging leg 50 and is disposed in the path of key fob engaging leg 50 as spring member 24 moves in an inboard direction.

Figure 6:
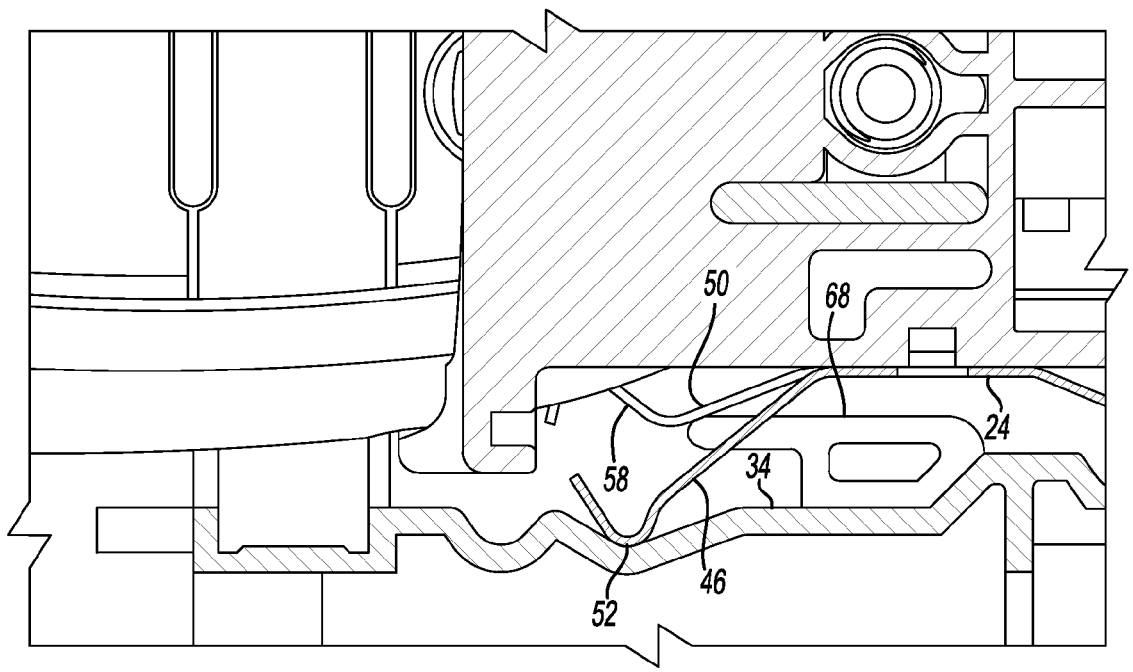

With respect to FIG. 6, key fob 44 and slider member 26 are illustrated at position PI. In this position, locking member 68 engages key fob engaging leg 50, inhibiting key fob engaging leg 50 from moving in a downward direction (from the perspective of FIG. 6). This obstruction, in turn, prevents key fob engagement portion 58 from becoming dislodged from notch 60. In this manner, key fob 44 cannot be pulled out of ignition module assembly 20 when slider member 26 is in position P1.

Figure 7:
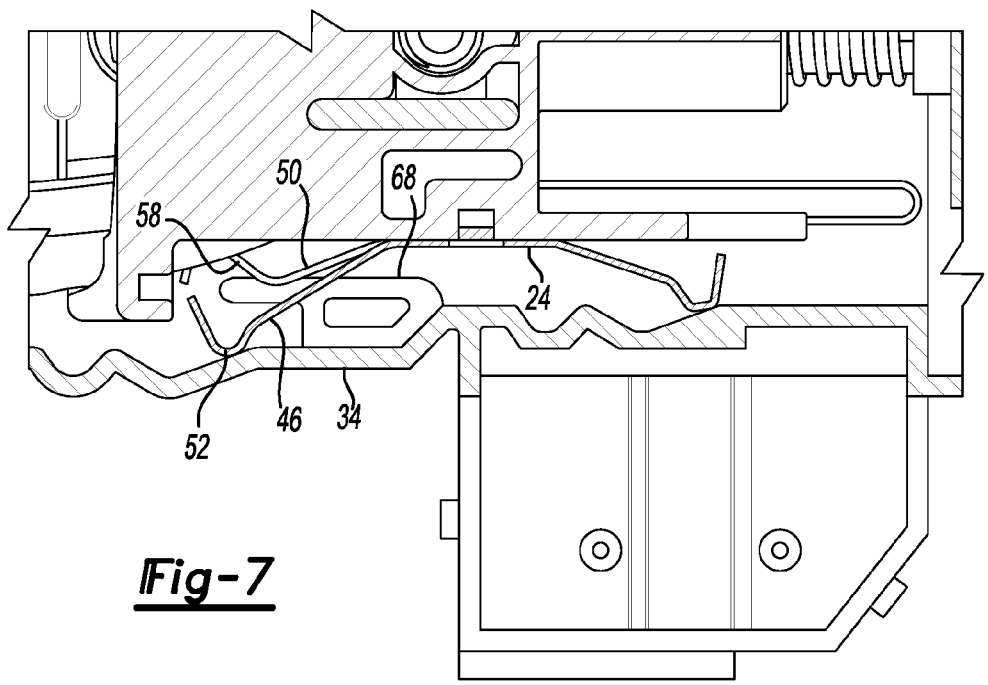
Figure 8:
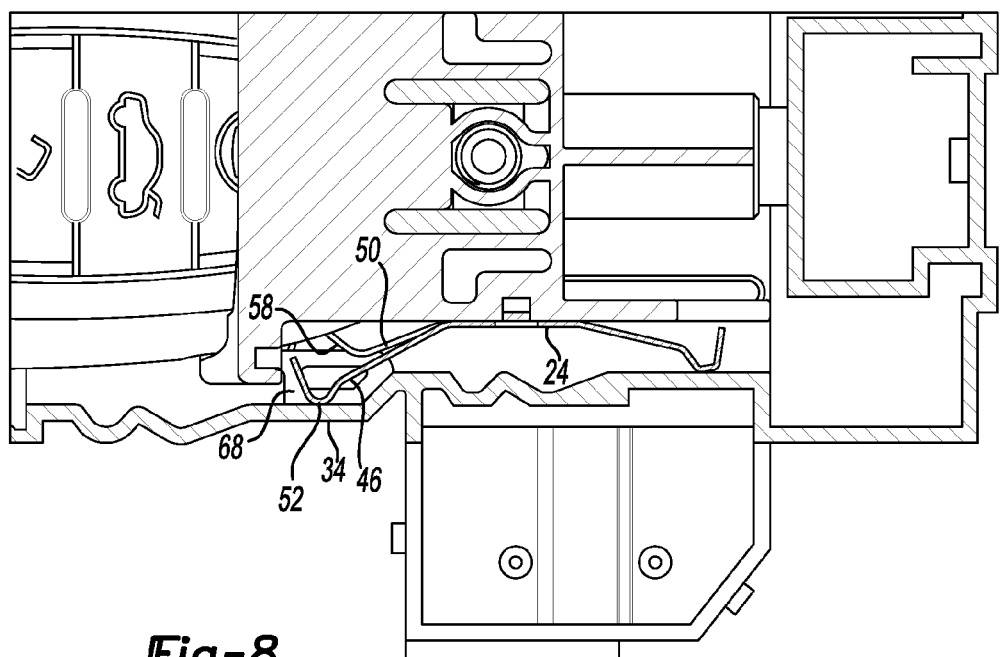

FIGS. 7 and 8 illustrate key fob 44 and slider member 26 at positions P2 and P3 respectively. These views illustrate that locking member 68 remains in contact with key fob engaging leg 50 as slider member 26 and key fob 44 move between positions P1 and P3 to prevent removal of key fob 44.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An ignition module assembly comprising:
  a housing member;
  a slider member that receives a key fob; and
  a spring member that is disposed between and engages the slider member and the housing member and that engages the key fob when the key fob is disposed in the slider member;
  wherein one of the slider member and the housing member includes an undulating surface; and
  wherein the spring member is configured to slide along the undulating surface as the slider member moves between a plurality of discrete positions to provide haptic feedback for a user to discern when the slider member has moved to one of the plurality of discrete positions.

2. The ignition module assembly of claim 1 wherein the spring member is fixedly disposed on the slider member and the undulating surface is disposed on the housing member.

3. The ignition module assembly of claim 1 wherein the spring member includes a key fob engaging leg and the key fob includes a notch, wherein the key fob engaging leg is configured to engage the notch.

4. The ignition module assembly of claim 1 wherein the plurality of discrete positions correspond with a different operating state of an ignition system.

5. The ignition module assembly of claim 1 wherein the spring member includes a plurality of spaced apart legs that engage the undulating surface of the housing member as the slider member moves between the plurality of discrete positions.

6. The ignition module assembly of claim 1 wherein the spring member includes a pair of forward extending legs and a pair of rearward extending legs, the pair of forward extending legs being spaced apart from the pair of rearward extending legs.

7. The ignition module assembly of claim 5 wherein the undulating surface includes first and second segments that are spaced apart and have similar configurations.

8. The ignition module assembly of claim 7 wherein the undulating surface includes hills and valleys, wherein each spaced apart leg engages a hill at substantially the same time that each other spaced apart leg engages a hill and wherein each spaced apart leg engages a valley at substantially the same time that each other spaced apart leg engages a valley.

9. The ignition module assembly of claim 1 wherein the spring member includes a key fob engagement portion disposed between and spaced apart from a pair of forward extending legs.

10. The ignition module assembly of claim 1 further comprising a blocking member that is moveably disposed in the slider member and configured to move between a blocking position in which inboard movement of the slider member is inhibited and a non-blocking position in which inboard movement of the slider member is not inhibited.

11. An ignition module assembly comprising:
  a housing member connected to an ignition system of a vehicle, the housing member having a first wall having a first undulating surface and a second wall having a second undulating surface;
  a slider member that receives a key fob and that is disposed in the housing member and configured to move between a plurality of discrete positions; and
  first and second spring members fixedly disposed on opposite sides of the slider member, wherein the first and second spring members engage the first and second undulating surfaces, respectively, and the first spring member includes a first key fob engaging leg that is configured to engage a first notch in the key fob and wherein the second spring member includes a second key fob engaging leg that is configured to engage a second notch in the key fob;

wherein undulations in the first and the second undulating surfaces correspond to the discrete positions, wherein a user may operate the ignition system by inserting the key fob into the slider member and moving the slider member with the key fob between the plurality of discrete positions.

12. The ignition module assembly of claim 11 wherein the housing member includes a first locking member configured to engage the first key fob engaging leg and a second locking member configured to engage the second key fob engaging leg.

13. The ignition module assembly of claim 12 wherein the first and the second locking members are disposed on the first and the second undulating surfaces, respectively.

14. The ignition module assembly of claim 11 wherein the first and the second spring members each include a plurality of spaced apart legs that engage the first and the second undulating surfaces, respectively, as the slider member moves between the plurality of discrete positions.

15. The ignition module assembly of claim 11 wherein the first spring member includes a pair of forward extending legs and a pair of rearward extending legs, the pair of forward extending legs being spaced apart from the pair of rearward extending legs.

* * * * *